UNITED STATES PATENT OFFICE.

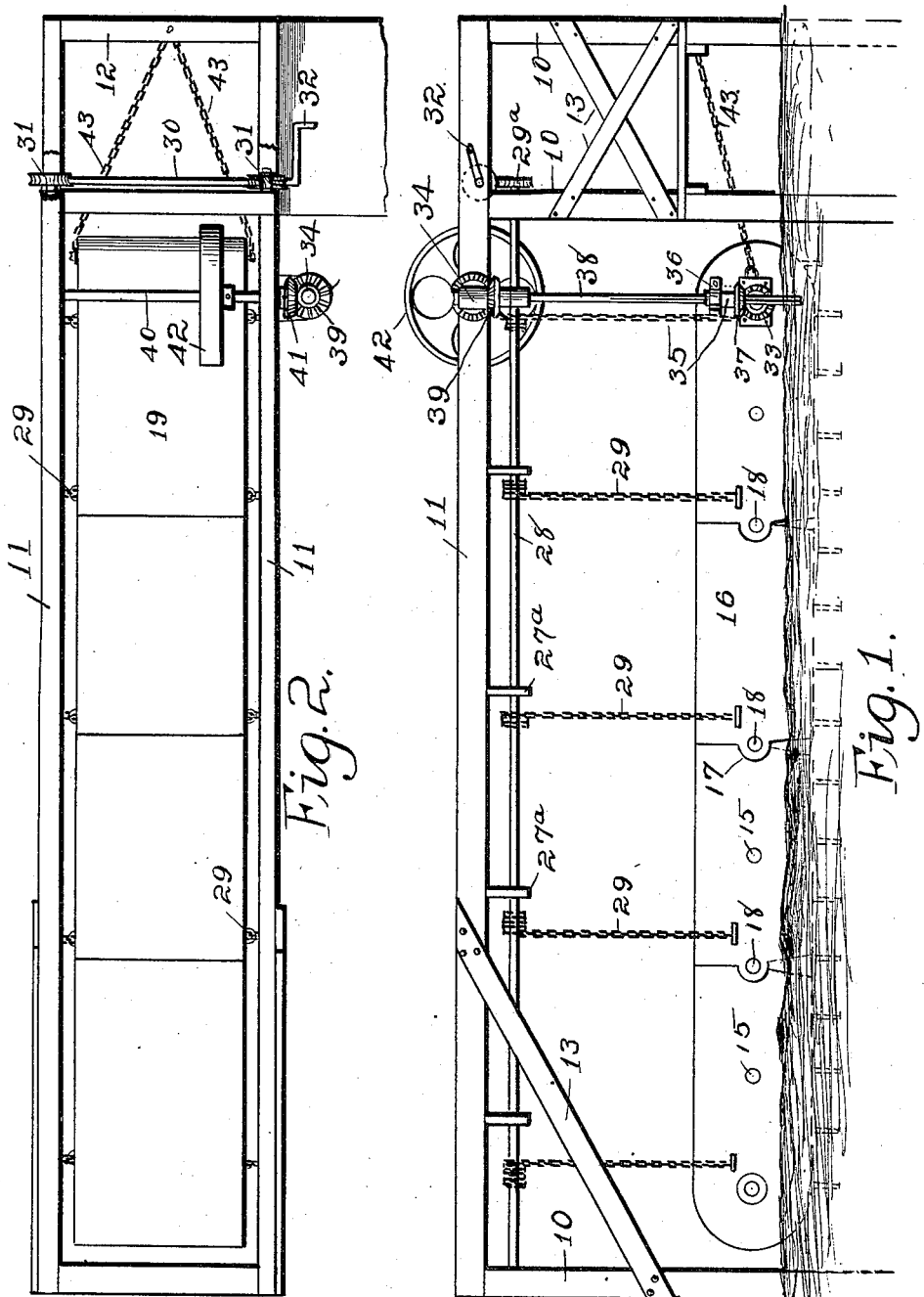

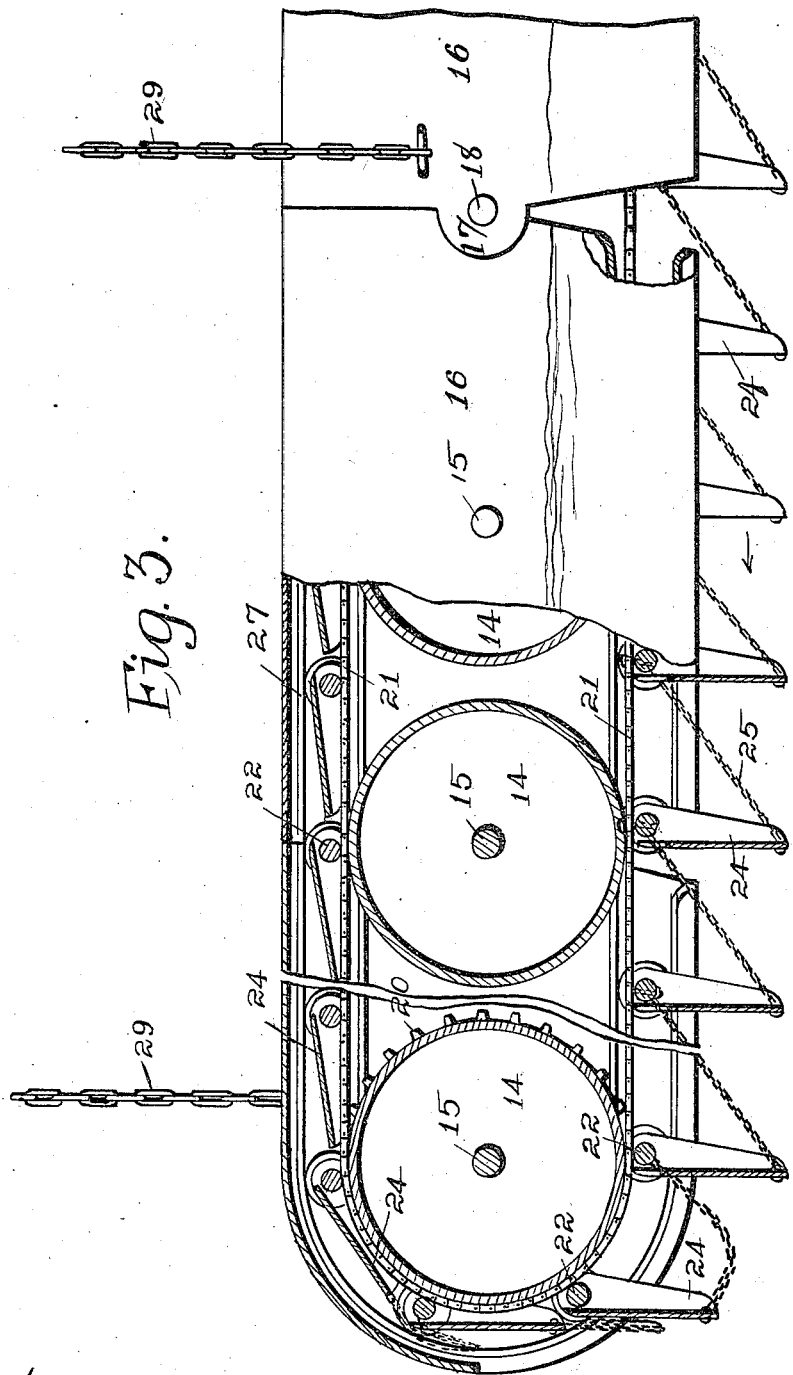

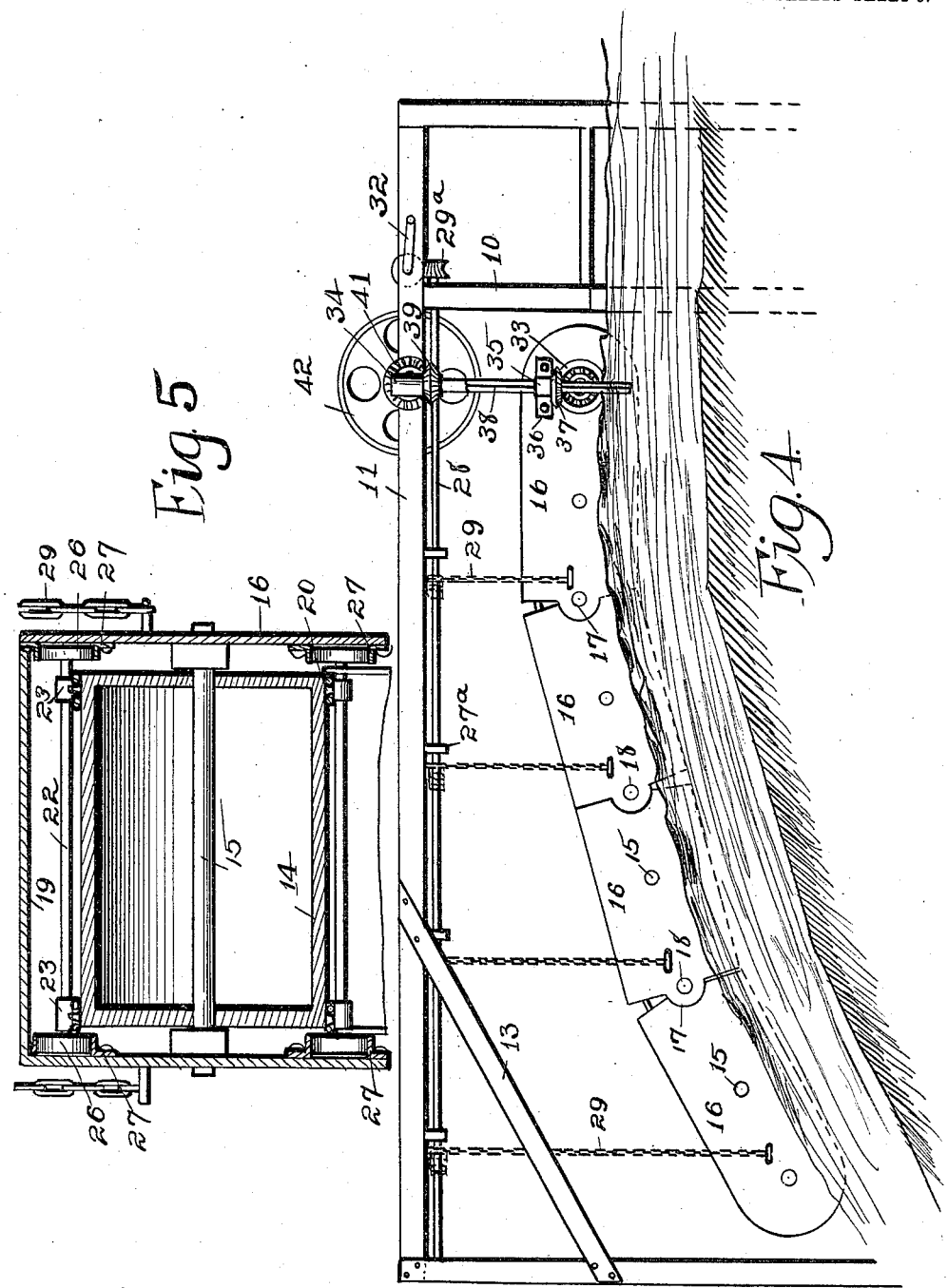

SYLVESTER RONEY, OF VALLEY JUNCTION, IOWA.

CURRENT-MOTOR.

1,045,191.  Specification of Letters Patent.  Patented Nov. 26, 1912.

Application filed July 3, 1911. Serial No. 636,722.

*To all whom it may concern:*

Be it known that I, SYLVESTER RONEY, a citizen of the United States, residing at Valley Junction, in the county of Polk and State of Iowa, have invented a certain new and useful Current-Motor, of which the following is a specification.

The object of my invention is to provide a water current motor device in which the paddles and parts immediately connected therewith will float on the water and will rise and fall with the rise and fall of said water.

A further object is to provide such a device in which paddles travel over rotatably mounted drums, and in which said drums support the device on the surface of the water.

A further object is to provide such a device in which said drums and paddles are mounted in a jointed frame so constructed that different sections of the frame and the parts of the mechanism contained in such sections may rest in different horizontal planes, and which device is therefore adapted for use over a dam, or in an ordinary current of water where there is no dam.

A further object is to provide simple and efficient means whereby the motion imparted to paddles by a current of water may be made available for use for running machinery.

A further object is to provide simple mechanism whereby the drums and paddles and the jointed frame in which they are mounted may be lifted above the surface of the water.

A water current motor is desirable which is inexpensive and durable, and which at the same time is readily adapted for use under varied conditions by slight modifications in its construction.

It is therefore more particularly my object to provide a water current motor which by means of slight variations in construction will be adapted for use in various places, and in various conditions of water current.

It is an object of my invention to provide a device of the kind mentioned, which is readily adapted for use in a flowing current of water where there are no dams or other obstructions. The nature and construction of my device are such that it may also be used in connection with a dam or at a point on the stream where there is a waterfall.

It is seen then that it is my general purpose to provide a water current motor, adaptable for use under a great variety of conditions and circumstances.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of a water current motor device embodying my invention. Fig. 2 shows a top or plan view of the same. Fig. 3, shows a side elevation of the drums and the paddles, and the jointed casing therefor, partly in section. Fig. 4 shows a side elevation of my improved water current device located over a dam, or waterfall, and Fig. 5 shows a central, transverse, vertical section of one of the rotatable drums.

In the accompanying drawings, I have used the reference numeral 10 to indicate upright posts, the lower ends of which are set in the bed of the river.

The posts 10 at each end of the device are connected by horizontal members 11, and cross members 12. The posts 10 and the members 11 and 12 form a suitable frame work on which the other parts of my improved device are supported. Reinforcing cross braces 13 are employed to strengthen said frame. On the surface of the water are a number of hollow drums 14 of cylindrical shape. Centrally mounted in said drums are fixed shafts or axles 15. The ends of the axles 15 are rotatably mounted in the sections 16 of a jointed casing. Each of the sections 16 which form the sides of the casing is substantially rectangular in shape, and is pivotally connected with the next succeeding and preceding section, so that the sections 16 may move vertically with relation to each other. They may be connected with each other in any suitable way. In the drawing, an overlapping ear 17 is shown on each section. A rivet or bolt 18 extends through the overlapping ear and through the next succeeding section 16. The sections 16 on the opposite sides of the device, are connected at their upper ends by the top or cover portions 19.

Assuming that the portion of the device shown at the right hand side of Fig. 1, is the up stream portion thereof, it will be seen that when the device is located over a dam, as in Fig. 4, the section 16 and the parts connected therewith, at the down stream end of the device may be lower than the section 16 at the other end of the device. One of the purposes in hinging or pivoting the sections 16 together by means of bolts 18, is thus made clear. On each end of the end drums 14 are circumferentially arranged teeth 20 which form sprocket gears. Traveling on the teeth 20 on each end of the said drums 14 are sprocket chains 21. A plurality of shafts 22 are rotatably mounted at each end in bearings 23 on the said sprocket chains. Said shafts 22 extend across the device. Pivotally mounted on the shafts 22 are paddles 24. The free ends of the paddles 24 are secured against movement past right angles with the chains 21, in one direction by means of limiting chains 25 secured to said free ends, and to the next axle 22 on the up stream side of the device when the paddles are below the drums 14.

Referring to Fig. 3, and considering the portion of the device at the right hand side of the figure to be up stream, it will be seen that when the paddles 24 are below the drums, their weight causes them to hang in vertical position where they will catch the full force of a current of water. The limiting chains 25 prevent their movement past vertical position. The movement of the current causes the paddles 24 to move in a direction indicated by the arrow in Fig. 3, and thus rotates the drums at the ends of the device. As the paddles move upwardly around the drum at the down stream end of the device, they drop to substantially horizontal position, as clearly shown in said Fig. 3. On each end of each of the shafts 22, is a roller 26. The rollers 26 travel in tracks 27 located on the inner sides of the sections 16. The rollers 26 and the tracks 27 add to the strength of the device and insure the travel of the paddles 24 in a true path.

The mechanism heretofore described is supported on the frame of the device in the following manner: Bearings 27ª extend downward from each of the horizontal members 11. Rotatably mounted in the bearings 27ª beneath each of the horizontal members 11 are shafts 28. Secured to the shafts 28 are a number of chains 29. The chains 29 are secured to the outer sides of the sections 16 in any suitable way. At one end of each of the shafts 28 is a gear wheel 29ª. Rotatably mounted in the frame of the device near the gear wheels 29ª is a transverse shaft 30 on which are formed worm gears 31 in mesh with the gears 29ª. A crank handle 32 is formed on one end of the shaft 30. By the rotation of the crank handle 32, the chains 29 may be wound upon the shafts 28 and the sections 16 together with the parts therein, may be raised above the surface of the water.

The rotary motion of the end drums 14 may be imparted to machinery by means of the following mechanism: Mounted on the end of the shaft 15 of one of the end drums 14, is a beveled gear 33. Secured to the side of said section 16 near the beveled gear 33 is a bearing 36. In mesh with the beveled gear 33, is a horizontal beveled gear 37 on which is a hub 35 rotatably mounted in the bearing 36. The hub 35 is slidably mounted on an upright angular shaft 38. The upper end of the shaft 38 is round and is rotatably mounted in the bearing 34 on one of the horizontal members 11. Fixed on the shaft 38 near its upper end is a beveled gear 39. A transverse shaft 40 is mounted in the frame of the device and on the end of the shaft 40 is a beveled gear 41, in mesh with the beveled gear 39. At the other end of the shaft 40 is a belt wheel 42 which may be used in the ordinary way for running machinery.

Longitudinal movement of the sections 16 with reference to the frame of the device is prevented by means of mooring chains 43 by which the end sections 16 are secured to the posts 10.

A large number of variations in details of construction of my device may be made without affecting its essential purpose.

In practical operation my device is located in a current of water and the sections 16 with the mechanism contained therein are lowered by means of the crank handle 32 and its accompanying mechanism until the drums 14 float on the surface of the water. Movement of the device down stream is prevented by the posts 10 which are set in the bed of the stream, and by means of the mooring chains 43. When the device is placed in the water, the paddles 24 on the lower side of the drums drop to vertical position and receive the force of the current. The current drives the paddles 24 in the direction indicated by the arrow in Fig. 3, and the chains 21 traveling on the teeth 20 cause the rotation of the end drums 14. When the paddles 20 pass upwardly around the drum 14 at the down stream end of the device, they drop to horizontal position. The rotation of the up stream drum 14, turns the shafts 38 and 40 and consequently rotates the belt wheel 42.

When it is desired to lift the operative parts of the mechanism out of the water, this may be done by the crank handle 32 and the mechanism connected therewith. On account of the pivotal connection of the sections 16, the drums 14 may be placed over a dam, as shown in Fig. 4, in which case the down stream section 16 will be lower than the up stream section 16. The length of the chains 29 may be varied to suit the circumstances of the location of the device.

It will be seen that the device as shown is readily adapted for use in an ordinary stream where there is no dam or in connection with a dam, or where there is a waterfall. My improved water current device may be used on the surface of the water or if desired, water can be admitted to the drums 14 and the operative parts of the device submerged. It is clear that the paddles and the drums will operate when wholly submerged on account of the pivoted connection of the paddles.

It will be seen from what has just been said, that the particular mechanism for imparting motion of the drums or of the axles 15 to machinery, is of comparatively small importance for the reason that a great many ways for doing this may be used with my improved device.

My improved water current motor has the advantage of cheapness and simplicity of construction.

My improved device may be used in an ordinary current of water where there is no dam. This is considered an extremely advantageous feature of the device in so much as the construction of a dam is always expensive, and in some localities is practically impossible. At the same time on account of the feature of the jointed casing, my device may be used in connection with a dam by varying the length of the chains 29.

The simplicity and inexpensiveness of the plurality of floating drums rotatably mounted in a casing, which is fixed against movement with the stream, together with simple means, whereby the movement of the current is imparted to the drums and the movement of the drums made available for operating machinery, make the device one which is adapted to locations where economy of construction is important.

By means of the simple mechanism heretofore described, the operative parts may be lifted out of the water when the device is not in operation. By means of the floating drums 14, the device is automatically accommodated to ordinary variations in height of the stream.

I claim as my invention:

1. In a device of the class described, a frame fixed with relation to a current of water, a plurality of casing members open at their ends and lower sides, secured to said frame, said casing members being pivotally connected with each other successively, a plurality of drums rotatably mounted in said casing members, and designed to float on said water, means whereby the motion of a current of water imparts rotary motion to said drums, and means whereby the motion of said drums may be imparted to machinery.

2. In a device of the class described, a frame fixed with relation to the bed of a stream of water, a plurality of casing members open at their ends and lower sides, pivotally connected with each other successively, adjustable means for securing said casing members to said frame, a plurality of drums rotatably mounted in said casing members, means whereby the motion of a current of water imparts rotary motion to said drums, and means whereby the motion of said drums may be imparted to machinery.

3. In a device of the class described, a frame fixed with relation to the bed of a stream of water, a plurality of casing members open at their ends and lower sides, pivotally connected with each other successively, adjustable means for securing said casing members to said frame, said means comprising longitudinal shafts mounted in said frame above said drums, chains secured to said shafts and to the said casing members, and means for rotating said shafts, and winding said chains thereon.

Des Moines, Iowa, June 27, 1911.

SYLVESTER RONEY.

Witnesses:
M. WALLACE,
M. PETERSON.

---

Copies of this patent may be obtained for five cents each, by addressing the "Commissioner of Patents, Washington, D. C."